Aaron F. Aunspaugh
INVENTOR.

BY Hayden & Pravel

Nov. 9, 1965    A. F. AUNSPAUGH    3,216,145
FISHING REEL DRIVE MECHANISM
Filed Oct. 4, 1963    2 Sheets-Sheet 2

Aaron F Aunspaugh
  INVENTOR.
BY Hayden & Pravel

United States Patent Office 3,216,145
Patented Nov. 9, 1965

1

3,216,145
FISHING REEL DRIVE MECHANISM
Aaron F. Aunspaugh, 5638 Northridge St., Houston, Tex.
Filed Oct. 4, 1963, Ser. No. 313,994
2 Claims. (Cl. 43—21.2)

This invention relates to new and useful improvements in power mechanisms for supplying rotational power to a conventional fishing reel.

Much fishing for sport and game fish is done in salt water by sportsmen employing a fishing reel mounted on a fishing rod. Deep sea fishing is usually attempted with several hundreds of yards of fishing line placed on the drum of the reel, due to the fact that a long length of line is often necessary. For instance, deep sea fishing is sometimes done by trolling in a slowly moving craft with lures or baited hooks trailing about two or three hundred yards behind the craft. Of course, the larger fish present in salt water are often strong enough to take a hook and pull two or three hundred yards of line out of the reel in one run. For these and other reasons, salt water fishing is often done with more than five hundred yards of line on the drum of the reel.

The labor required to retrieve several hundred yards of fishing line with a strong fighting fish hooked at the other end is appreciable. Electrically operated fishing reels have been made available for sportsmen to reduce the effort required in retrieving a large amount of line. Such electrically operated fishing reels are expensive and lack versatility in that the motors are permanently attached to the fishing reels. This invention relates to a motor attachment for a hand powered fishing reel which does not require alteration of the fishing reel and the subsequent loss of versatility.

Therefore, an object of this invention is to provide a new and improved apparatus for releasably attaching rotative power to a conventional fishing reel.

A further object of this invention is to provide a new and improved fishing apparatus having a convertible power attachment which may be temporarily connected to all sizes of hand powered fishing reels.

An important object of this invention is to provide a new and improved fishing reel power attachment and mounting means therefor which is adapted to be releasably attached to a fishing reel for eliminating strain and fatigue on the part of the operator when retrieving a fishing line with said reel.

Another object of this invention is to provide a new and improved fishing reel power attachment which clamps on the fishing rod without interfering with the primary function of the rod or reel.

Yet another object of this invention is to provide a new and improved power attachment for a conventional fishing reel utilizing a flexible drive shaft which aligns itself with the crank of the reel regardless of the location of the crank.

Yet a further object of this invention is to provide a new and improved power attachment for a conventional fishing reel and rod which has easily gripped handles enabling the fisherman to hold the invention in both hands.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein.

Figure 1:
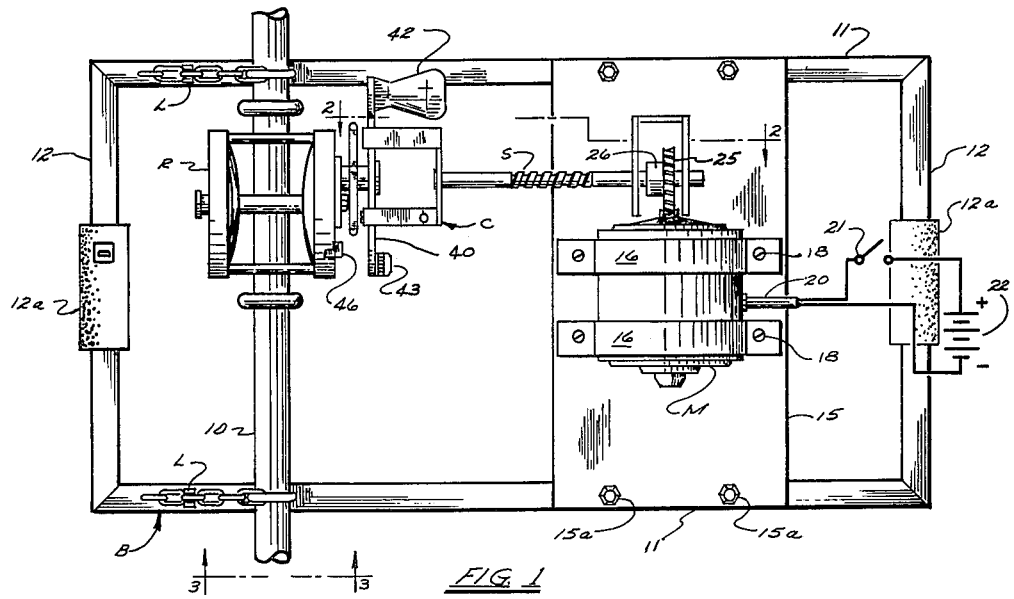
FIG. 1 is a plan view of the power attachment of this invention showing its connection to a conventional rod and reel.

In the drawings, the letter R designates a conventional fishing reel which is mounted in the normal manner on a fishing rod 10. The rod 10 is clamped against a base B having mounted thereon an electric motor M. The motor M generates torque which is applied to a flexible drive shaft S which extends from the motor towards the face of the reel. A clamp C is attached to the end of the flexible drive S and is fastened to the hand crank of the reel R to impart rotation thereto. With the present invention, the conventional fishing reel may be operated with the power from the motor M when desired, while still making it possible to manipulate the reel by hand when hand operation is preferred on detachment of the clamp C. Thus, the necessity for having two different reels for hand and power uses is avoided.

Figure 3:
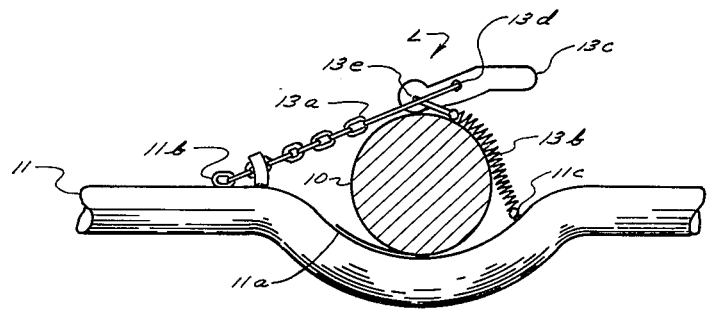
FIG. 3 is a sectional view taken along the line 3—3 of FIG. 1 omitting the fishing reel and illustrates means securing the conventional fishing rod to the power attachment.

Considering the invention more in detail, the reel R is of the conventional bait-casting type having a centrally positioned takeup drum and a hand crank mounted on one face of the takeup drum. The reel R may have other features such as a level wind mechanism which does not interfere with the operation of the invention. The reel R is connected to the rod 10 in the conventional manner and the rod 10 is thereafter secured to the base B by one or more connectors L. Such connection is better shown in FIG. 3 which shows that the base B may be made of tubular stock, if desired. The base B includes a pair of cross members 11 which are perpendicular to the fishing rod 10 when the rod 10 is mounted on the base B. An indentation 11a is preferably provided in each of the tubular members 11 adjacent the fishing rod 10 to define a recess for receiving the fishing rod 10. After the fishing rod 10 is placed in each of the indentations or recesses 11a, the fishing rod 10 may then be secured in place by operating the connectors or latches L. Although the latches L may be made in various ways, each latch L shown in the drawings includes a tension member 13a which is secured to the tubular member 11 at 11b. A flexible and extendable spring 13b is anchored to the base B at 11c and is connected at the upper end to a handle 13c. A hole 13d in the handle 13c receives the upper end of the tension member 13a when the handle 13c is in a vertical position before the latch is operated to secure the rod 10 to the base B. The latch L operates similarly to a trunk latch, in that the handle 13c is rotated clockwise as viewed in FIG. 3 to pull the members 13a and 13b past dead center at 13e and thus tightly against the fishing rod 10, as shown in FIG. 3.

Figure 2:
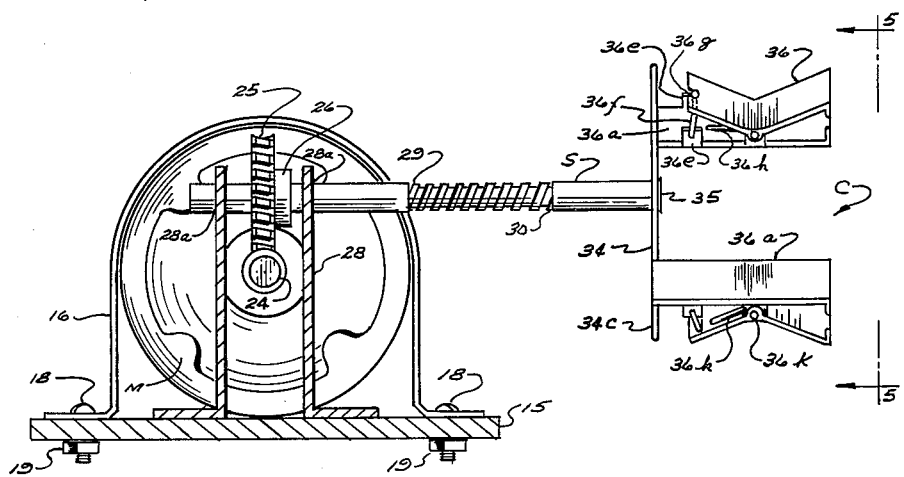
FIG. 2 is a sectional view taken along line 2—2 of FIG. 1 with the fishing fishing reel and hand crank omitted and which discloses details of the flexible drive mechanism.

The base B, as previously mentioned, as preferably made of tubular stock with a pair of end braces 12 connected between the longer cross member 11. Each brace 12 has a hand grip 12a positioned at or near the center of the brace 12 to provide a comfortable hand hold which the fisherman may grasp to maneuver the rod 10. The base B also includes a motor mount 15 extending between the longer braces 11 which is preferably made of marine plywood. The motor mount 15 is attached to the braces 11 by bolts or screws 15a or other suitable means and, as shown in FIG. 2, receives and supports the motor M above the base B. The motor M is secured to the motor mount 15 by extending two flexible straps 16 over the motor. The straps 16 are connected to the mount 15 at each end by any known means such as a bolt 18 having a nut 19 engaged therewith on the opposite side of the mount 15.

The motor M is an electric motor which is preferably operated by power furnished by the shipboard electrical system. An electrical cable 20 extends from the motor M to a switch 21 and thence to a battery 22 which may be a portion of the shipboard electrical system. The switch 21, which is represented schematically in FIG. 1, may be positioned on the short brace 12 adjacent to or mounted on the handle grip 12a for convenience of the operator who may then simply flip the switch to apply power to the motor M. The motor M has a conventional shaft 24 extending from the rotor and it has a continuous thread cut on the outer surface to form what is commonly known as a worm gear. A gear 25 meshes with the worm gear of the shaft 24 and rotates at a velocity determined by the ratio of the teeth of the two gears and the speed of the motor. The gear 25 is held on the shaft S by a collar 26 and the shaft S and the gear 25 are held in position relative to the worm gear 24 by a gear box 28 which is placed on the mount 15. The gear box 28 has a pair of aligned holes 28a for receiving the shaft S therethrough as illustrated in FIG. 2.

The shaft S is preferably of a rigid construction at the left end as viewed in FIG. 2 to maintain the gear 25 in the proper relationship with the worm gear 24. However, the shaft S is preferably flexible at some location near the center for reasons to be explained. The flexible portion may extend from just beyond the opening 28a of the gear box 28 at its lefthand extremity 29 towards the right end of the shaft S to a point 30 which defines a rigid portion of the shaft S at the righthand end. The flexible drive S at the righthand end 35 is equipped with a keyed or non-circular cross-section, as will be explained. The motor M is preferably mounted on the base B so that the drive shaft S may extend between the motor perpendicular to the reel R without kinking or binding when torque is applied to the input end. The shaft S is preferably flexible so that the motor M and the shaft S need not be realigned when various and different models of fishing reels R are installed on the base B. Some fishing reels vary greatly in size and others vary in location of the hand crank so that it would be difficult to align the shaft S perfectly with all fishing reels commercially available. Therefore, the problem of alignment is disposed of by deflecting the flexible drive S from the position illustrated in FIGS. 1 and 2.

Figures 5, 6:
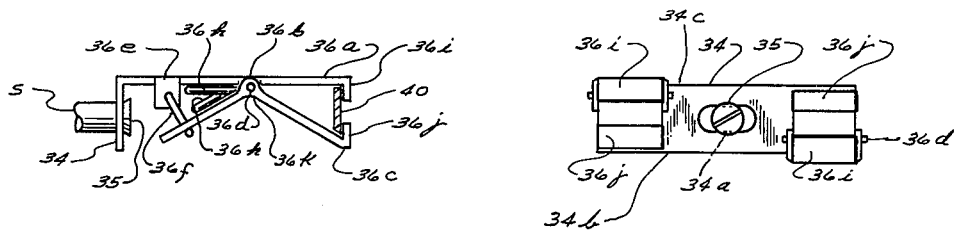
FIG. 5 is a sectional view taken along the line 5—5 of FIG. 2 illustrating one means of connecting the drive mechanism to the hand crank of the reel which figure omits the motor and gear mechanism.
FIG. 6 is a side view of one of the clamps shown in FIG. 5.

A longitudinally extending bracket 34 having a centrally located hole 34a is placed at the output end of the shaft S on the keyed cross-section 35 (FIG. 5) of the shaft S and the shaft S is flared and screwed (FIGS. 5 and 6) to lock the bracket 34 to the shaft S. The shaft S is keyed to prevent relative rotation between the shaft S and the bracket 34 when the motor rotates the shaft S. The bracket 34 extends perpendicularly from the shaft S to support a pair of spring-loaded hooks or clasps 36. The clasps 36 are positioned at or near opposite ends of the bracket 34. Each clasp 36 is formed with a rigid member 36a which is connected to a side edge of the bracket 34. Thus, the upper clasp 36 (FIG. 2) has the plate 36a secured to the bottom side edge 34b (FIG. 5) while the lower clasp 36 has its plate 36a secured to the top side edge 34c. Each plate 36a has a pair of ears 36b located near the mid-point thereof. A V-shaped member 36c is positioned with the point of the V adjacent the plate or member 36a near the ears 36b so that a pin 36d may be passed through the ears 36b and mating ears 36k to form a pivot for the V-shaped member 36c. Another pair of ears 36e is formed on the member 36a as supports for a locking wire 36f which is bent to engage one extremity of the V-shaped member 36c. The end of the locking wire 36f extends through a slot 36g (FIG. 2) formed in the V-shaped member 36c to lock or restrict motion of the V-shaped member 36c. A spring having a pair of legs 36h is positioned against the surfaces of the members 36a and 36c. The outer end of the member 36a is usually bent to form a flange 36i and the outer end of the V-shaped member 36c is also normally bent to define a flange 36j which extends towards the flange 36i. Pressure is applied to the members 36a and 36c by the spring legs 36h positioned against each of the members 36a and 36c which tends to urge the flange 36j towards the flange 36i. The movement of the two flanges, 36i and 36j, engages objects placed within the flanges as will be explained in more detail.

Figure 4:
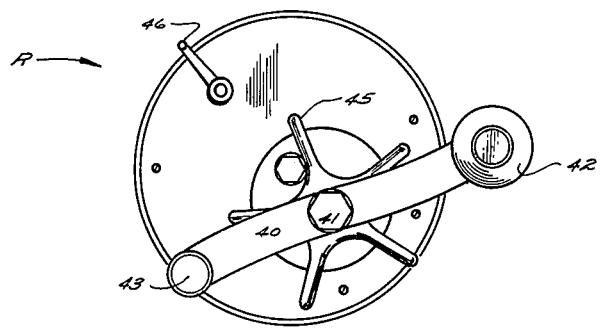
FIG. 4 is an end view of the fishing reel illustrating the hand crank of the conventional fishing reel.

The fishing reel R shown in FIG. 4 has the hand crank 40 mounted on a shaft 41 which connects to conventional internally contained gears (not shown). A handle 42 is placed on one end of the hand crank 40 and a cylindrical projection 43 is placed on the other end of the hand crank 40. A conventional star drag adjustment 45 is also mounted on the shaft 41 to provide means controlling the amount of drag acting on the fishing line when a fish has seized the hook to pull line from the reel R. A clutch control lever 46 is also provided on the reel R to provide means permitting the drum of the reel R to free-wheel when desired.

In operation, the reel R is attached to the rod 10 in a conventional manner and the rod 10 is positioned above the base B as shown in FIG. 1. The handle 13c of the latch L is contacted against the rod 10 to extend vertically thereabove with the tension member 13a and the spring 13b connected to the handle 13c. The handle 13c is then rotated to the position illustrated in FIG. 3 to press the rod 10 towards the inner curvature of the indentation 11a and to lock the rod 10 in such a position. Each of the latches L of the base B is operated to secure the rod 10 in position relative to the base B illustrated in FIG. 1. The clamp C on the end of the shaft S is held by the shaft S near the hand crank 40 and may be engaged with the hand crank 40 by opening the clamps 36. The locking wire 36f is disengaged from the slot 36g by pivoting the wire 36f about the ear 36e away from the V-shaped member 36c. Pressure is applied to the V-shaped member 36c to pivot the member 36c about the pin 36d against the force of the spring legs 36h. The flanges 36i and 36j, relative to one another, are separated to form an opening therebetween. The hand crank 40 is positioned between the flanges 36i and 36j of each clamp 36 (FIG. 1) to clamp the hand crank 40 to the flexible drive shaft S. The members 36a and 36c may then be locked in the clamped position by re-engaging the locking wire 36f with the nether surface of the member 36c. Each of the two clamps 36 is secured to the opposite ends of the hand crank 40 so that the torque may be applied through the shaft S and the clamp C to the hand crank 40 to rotate the hand crank 40 about the shaft 41.

Assuming a typical situation for purposes of illustration, it may be assumed that the reel R is attached to the rod 10 and about five hundred yards of fishing line is placed on the drum of the reel R. If the fisherman desires to troll from a slowly moving boat, the hook is placed in the water and the clutch of the reel R is released by operation of the lever 46 to allow the water acting on the hook to pull about two hundred yards of fishing line from the drum of the reel R as the boat moves through the water. When the hook is the proper distance behind the boat, the lever 46 may be actuated to engage the clutch of the reel R to limit the length of line in the water. The star drag mechanism is adjusted by operation of the star drag adjustment 45 to regulate the amount of resistance encountered when a fish pulls line from the drum of the reel R. When a fish takes the hook and begins to run with the hook to pull line from the reel R, the drag mechanism will function in the customary manner to slow the fish down. The fisherman then may reel line in while holding the invention with both hands at the hand grips 12a by operation of the switch 21 which supplies power to the motor M to rotate the shaft S. The torque in the shaft S is transferred to the hand crank 40 which rotates the drum of the reel R to retrieve line from the water. The switch 21 may be opened at any time to stop the motor M, in which case, the shaft S is locked against rotation, because the gear 25 and the worm gear 24 cannot transfer torque from the shaft S to the motor M. The switch 21 may be later operated and opened by the fisherman to retrieve the fish in the conventional manner. Also, the switch 21 may be operated to retrieve the fishing line in the water if the fisherman suspects that the bait on his hook needs replacing, or for any other reason.

Certain alterations may be made in the invention without departing from the spirit thereof. As an example, the base B may be made completely from marine plywood in which case the indentations 11a would take the form of a groove extending across the base B for receiving the fishing rod 10 and the grips 12a would be positioned on the edge of the base. The latches L used for securing the rod 10 to the base B may be altered in form to include any means for securing the rod 10 to the base B with a releasable connection. The motor M illustrated in the drawings is an electric motor operated by power from the shipboard power system, but those skilled in the art may substitute other motors, such as an air-driven or hydraulic motor. Also the motor M may be made reversible by placing an appropriate switch between the motor M and the power source. The gears 24 and 25 may be eliminated by positioning the motor M on the base B so that the rotating shaft of the motor M may connect directly to the flexible drive S. The flexible drive S is shown in the drawings with a flexible center portion between the points 29 and 30, but those skilled in the art may utilize universal joints in a solid shaft to provide power transfer means connected between the motor and the clamp C. The clamp C may be altered to any form of clamp sufficient for securing the bracket 34 to the hand crank 40; however, the clamps 36 are the preferred form because they provide means which are rapidly detachable from the hand crank 40.

The foregoing disclosure and description of the invention is illustrative and explanatory thereof and various changes in the size, shape and materials, as well as in the details of the illustrated construction, may be made within the scope of the appended claims without departing from the spirit of the invention.

I claim:
1. A power attachment releasably connectable to a conventional fishing rod and hand powered reel having a crank to provide mechanical operation thereof, comprising:
   (a) a base;
   (b) a pair of latch means carried on the base at spaced locations on the base for securing the base to the fishing rod with the reel between the pair;
   (c) each of said latch means being connected to said base on opposite sides of the fishing rod;
   (d) releasable, openable means included in said latch means and extending between said latch means connections on said base for securing the fishing rod therebetween;
   (e) a motor mounted on the base adjacent the fishing rod;
   (f) power transfer means connected at the input to the shaft of the motor and having an output substantially perpendicular to the fishing rod secured to the base;
   (g) a releasable clamp adapted to be directly coupled to the hand crank of a fishing reel attached to the fishing rod, said clamp being connected to the output of the power transfer means; and
   (h) power means for energizing the motor to operate the fishing reel.

2. A power attachment releasably connectable to a conventional rod and hand powered reel having a crank to provide mechanical operation thereof, comprising:
   (a) a base;
   (b) a pair of openable, releasable latch means carried on the base at spaced locations on the base for securing the base to the fishing rod with the reel between the pair of latch means;
   (c) a motor mounted on the base adjacent the fishing rod;
   (d) power transfer means connected at the input to the shaft of the motor and having an output substantially perpendicular to the fishing rod secured to the base;
   (e) a clamp adapted to be directly connected to the hand crank of a conventional reel attached to the fishing rod, said clamp being connected to the output of the power transfer means;
   (f) said clamp including a pivoted lever for extending around and clasping the crank of the fishing reel; and
   (g) power means for energizing the motor to operate the fishing reel.

References Cited by the Examiner
UNITED STATES PATENTS

| | | | |
|---|---|---|---|
| 1,417,508 | 5/22 | Foster | 123—179 |
| 1,582,445 | 4/26 | Border | 279—46 |
| 1,786,701 | 12/30 | Butlin | 81—57 |
| 2,190,398 | 2/40 | Bugatti | 43—21 |
| 2,714,271 | 8/55 | Stratton | 43—21 |
| 3,126,166 | 3/64 | Weinberg | 43—21 X |

ABRAHAM G. STONE, *Primary Examiner.*
JOSEPH S. REICH, *Examiner.*